(12) United States Patent
Glasper et al.

(10) Patent No.: US 6,211,326 B1
(45) Date of Patent: Apr. 3, 2001

(54) METHOD FOR THE PRODUCTION OF POLYESTER IMIDES CONTAINING CARBOXYL- AND HYDROXYL GROUPS AND THEIR USAGE IN WIRE ENAMELS

(75) Inventors: Brian W. Glasper, East Sussex; Geoffrey C. Rix, West Sussex, both of (GB); Klaus-Wilhelm Lienert, Hamburg (DE)

(73) Assignee: Schenectady International, Inc., Schenectady, NY (US)

( * ) Notice: Subject to any disclaimer, the term of this patent is extended or adjusted under 35 U.S.C. 154(b) by 0 days.

(21) Appl. No.: 09/308,117

(22) PCT Filed: Nov. 13, 1997

(86) PCT No.: PCT/EP97/06326

§ 371 Date: Jul. 13, 1999

§ 102(e) Date: Jul. 13, 1999

(87) PCT Pub. No.: WO98/23667

PCT Pub. Date: Jun. 4, 1998

(30) Foreign Application Priority Data

Nov. 26, 1996 (DE) ............................................... 196 48 830

(51) Int. Cl.[7] .......................... C08G 73/16; C08G 79/08; C08L 77/00; C09D 179/08
(52) U.S. Cl. ........................... 528/170; 528/45; 528/172; 528/173; 528/183; 528/188; 528/220; 528/228; 528/229; 528/288; 528/310; 528/317; 528/322; 525/437; 525/453; 524/538; 524/539; 524/541; 524/600; 524/602; 427/118; 427/120
(58) Field of Search ............................. 528/45, 172, 170, 528/173, 288, 220, 228, 183, 188, 229, 322, 310, 317; 525/453, 437; 427/118, 120; 524/600, 602, 538–539, 541

(56) References Cited

U.S. PATENT DOCUMENTS

| | | | |
|---|---|---|---|
| 4,208,464 | * 6/1980 | Ishizuka et al. | 428/377 |
| 4,217,389 | * 8/1980 | Peterson | 428/383 |
| 4,218,550 | * 8/1980 | Pauze | 525/437 |
| 4,296,229 | * 10/1981 | Pauze et al. | 528/45 |
| 4,389,457 | * 6/1983 | Pauze et al. | 528/45 |
| 4,446,300 | * 5/1984 | Mabney et al. | 528/288 |
| 4,513,113 | * 4/1985 | Peterson | 524/602 |
| 5,084,304 | * 1/1992 | Lienert et al. | 427/388.2 |
| 5,854,334 | * 12/1998 | Schink et al. | 528/298 |
| 6,022,918 | * 2/2000 | Lienert et al. | 524/378 |

FOREIGN PATENT DOCUMENTS

| | | | |
|---|---|---|---|
| 14 45 263 | 12/1961 | (DE) | C08G/14/14 |
| 1 495 100 | 7/1962 | (DE) | C08G/20/30 |
| 0 055 085 A1 | 6/1982 | (EP) | C08G/73/16 |
| 0 270 788 A2 | 6/1988 | (EP) | C08G/73/16 |
| WO 88 09359 | 12/1988 | (WO) | C09D/3/70 |
| WO 91/07469 | 3/1991 | (WO) | C09D/5/25 |
| WO 91 07439 | 5/1991 | (WO) | C07K/15/06 |

* cited by examiner

*Primary Examiner*—P. Hampton-Hightower
(74) *Attorney, Agent, or Firm*—Pillsbury Winthrop LLP

(57) ABSTRACT

The invention relates to a process for preparing hydroxyl- and carboxyl-containing polyesterimide resins, comprising as monomeric components:

(A) imide-forming compounds having at least two primary amino groups and/or at least two isocyanate groups or imide-forming compounds having at least one primary amino group and/or at least one isocyanate group and at least one further functional group selected from hydroxyl, carboxyl and/or carboxylic anhydride, (B) polycarboxylic acids and/or their anhydrides and/or their esters and (C) polyols, characterized in that (I) component (A) is reacted with part of component (B) to form a polyimide, (II) the polyimide obtained in accordance with stage (I) is reacted with component (C) to form a polyesterimide, and finally (III) the polyesterimide obtained in accordance with stage (II) is reacted with the remaining part of component (B) to form the Also embraced by the invention is the use of the polyesterimides prepared by the process according to the invention as binders, and wire enamels comprising hydroxyl- and carboxyl-containing polyesterimides having an acid number >80 mg of KOH/g which can be prepared by the process according to the invention.

18 Claims, No Drawings

METHOD FOR THE PRODUCTION OF POLYESTER IMIDES CONTAINING CARBOXYL- AND HYDROXYL GROUPS AND THEIR USAGE IN WIRE ENAMELS

FIELD OF THE INVENTION

The invention relates to a process for preparing carboxyl- and hydroxyl-containing polyesterimides, to their use as binders and to wire enamels comprising such binders.

BACKGROUND OF THE INVENTION

The wire enamels commonly employed today are in general solutions of the typical binders, for example polyesterimides, in solvents, alone or in combination with customary commercial hydrocarbon cuts.

Polyesterimide enamels are known, for example, from DE-A 1445263 and 1495100 and from WO 91/07469 (PCT-EP 90/01911). Because of their good mechanical, thermal and chemical properties they have found broad application in the wire-coating industry.

The preparation of these polyesterimides takes place in a known manner from polyols, polycarboxylic acids or derivatives thereof and from imide-forming components.

SUMMARY OF THE INVENTION

The wire enamels known from the prior art, based on polyesterimides, combine the proven good enamel properties with, however, only limited coating rates, which are critically dependent on the evaporation rate of the low molecular mass reaction produces in the course of curing of the wire enamels.

The object of the present invention, therefore, was to provide wire enamels which allow improved coating rates and at the same time lead to enamel films having particularly good properties, such as, in particular, good adhesion to the wires, high breakdown voltage, high softening temperature, sufficiently high thermal shock, and high outer-fiber extension. Moreover, the wire coating compositions should combine a solids content which is as high as possible with a viscosity favorable for processing.

It has surprisingly been found that wire enamels comprising hydroxyl- and carboxyl-containing polyesterimides as binders meet these objects outstandingly. In this case, the hydroxyl- and carboxyl-containing polyesterimides have acid numbers of at least 80 mg of KOH/g and are composed of the following monomeric components:

(A) imide-forming compounds having at least two primary amino groups and/or at least two isocyanate groups or imide-forming compounds having at least one primary amino group and/or at least one isocyanate group and at least one further functional group selected from hydroxyl, carboxyl and/or carboxylic anhydride, (B) polycarboxylic acids and/or their anhydrides and/or their esters and (C) polyols.

Also embraced by the invention is a process for preparing hydroxyl- and carboxyl-containing polyesterimide resins, comprising the monomeric components (A), (B) and (C), embracing the following individual steps (stages):

(I) the reaction of component (A) with part of component (B) to form a polyimide, (II) the reaction of the polyimide obtained in accordance with stage (I) with component (C) to form a polyesterimide, and finally (III) the reaction of the polyesterimide obtained in accordance with stage (II) with the remaining part of component (B) to form the hydroxyl- and carboxyl-containing polyesterimide, and the use of the hydroxyl- and carboxyl-containing polyesterimides prepared in this way as binders in coating compositions.

DETAILED DESCRIPTION OF THE INVENTION

The Monomeric Components (A), (B) and (C) of the Hydroxyl- and Carboxyl-containing Polyesterimide According to the Invention Monomeric components (A) having primary amino groups which may be mentioned in particular by way of example are diprimary diamines, for example ethylenediamine, tetramethylenediamine, hexamethylenediamine, nonamethylenediamine and other aliphatic diprimary diamines.

Also suitable as monomeric components (A) are aromatic diprimary diamines, such as benzidine, diaminodiphenylmethane, diaminodiphenyl sulfone, diaminodiphenyl sulfoxide, diaminodiphenyl ether, diaminodiphenyl tioether[sic], phenylenediamines, tolylenediamines, and diamines with three benzene rings in the molecule, for example 1,4-bis(4-aminophenoxy) benzene. Also suitable, finally, are cycloaliphatlc diamines, such as 4,4',-dicyclohexylmethanediamine[sic], for example.

As amino-containing component (A) with a further functional group it is possible, for example, to use amino alcohols, for example monoethanolamine and monopropanolamines, and also aminocarboxylic acids, such as glycine, aminopropanoic acid, aminocaproic acids or aminobenzoic acids, and also their esters or anhydrides.

Examples of components (A) with isocyanate groups are, in particular, diprimary isocyanates, for example propylene diisocyanate, trimethylene diisocyanate, tetramethylene diisocyanate, pentamethylene diisocyanate, hexamethylene diisocyanate, ethylethylene diisocyanate, 3,3,4-trimethylhexamethylene diisocyanate, 1,3-cyclopenthyl[sic] diisocyanate, 1,4,-cyclohexyl[sic]diisocyanate, 1,2-cyclohexyl diisocyanate, 1,3-phenylene diisocyanate, 1,4-phenylene diisocyanate, 2,5-tolylene diisocyanate, 2,6,-tolylene[sic]diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl) methane, bis(4-isocyanatophenyl)methane, 4,4'-diisocyanatodiphenyl ether and 2,3-bis(8-isocyanatooctyl)-4-octyl-5-hexylcyclohexene. It is possible, furthermore, to employ industrially available distillation cuts, for example Desmodur VL® or Voranate M590®. It is preferred to employ Desmodur VL®, Voranate M590®, an isomer mixture comprising the tolylene diisocyanates, and bis(4-isocyanatophenyl)methane.

Examples of polycarboxylic acids suitable as component (B) are phthalic acid, isophthalic acid, terephthalic acid, 2,6-naphthalenedicarboxylic acid, and esterifiable derivatives thereof, for example anhydrides and the lower alkyl esters of said acids, for example methyl, ethyl, propyl, butyl, amyl, hexyl and octyl esters. It is also possible here to employ the monoesters, the diacyl esters and the mixtures of these compounds. Likewise suitable are the acid halides. Preferred components (B) are compounds having a cyclic carboxylic anhydride group and further functional groups, such as, with particular preference, pyromellitic dianhydride and trimellitic anhydride. However, other aromatic carboxylic anhydrides are also suitable as component (B), examples being the naphthalenetetracarboxylic dianhydrides or dianhydrides of tetracarboxylic acids having two benzene rings in the molecule where the carboxyl groups are in 3,3'4- and 4'-position[sic].

Also coming into consideration as component (B) are aliphatic dicarboxylic acids, for example oxalic acid, malonic acid, succinic acid, glutaric acid, adipic acid, pimelic acid, acelaic acid, sebacic acid, maleic acid, fumaric acid or sorbic acid, and their esterifiable or transesterifiable derivatives.

Alcohols suitable as component (C) are, in particular, diols and triols. Examples are ethylene glycol, 1,2- and 1,3-propylene glycol, 1,2-, 1,3- and 1,4-butanediol, 1,5-pentanediol, neopentyl glycol, diethylene glycol, triethylene glycol, glycerol, trimethylolethane, trimethylolpropane and tris-2-hydroxyethyl isocyanurate. The latter trial is employed preferentially for the polyesterimide resins. Its use leads to particularly high softening temperatures of the wire coating composition.

Particular preference is given, as component (C), to the use of a mixture of dials and trials. Mixtures of ethylene glycol and tris-2-hydroxyethyl isocyanurate are employed especially in this case.

The Process According to the Invention for Preparing the Hydroxyl- and Carboxyl-containing Polyesterides, and the Hydroxyl- and Carboxyl-containing Polyesterimides Thus Prepared The process according to the invention for preparing the hydroxyl- and carboxyl-containing polyesterimide is conducted in three stages:

(I) component (A) is reacted with a part, preferably from 50 to 90% by weight, based on (B), of component (B) to form a polyimide, (II) the polyimide obtained in accordance with stage (I) is reacted with component (C) to form a polyesterimide, and finally (III) the polyesterimide obtained in accordance with stage (II) is reacted with the remaining part of component (B), preferably from 10 to 50% by weight, based on (B), to form the hydroxyl- and carboxyl-containing polyesterimide.

The polyimides prepared in accordance with stage (I) are preferably obtained by reaction between component (B), employing preferably from 50 to 90% by weight of component (B), based on the overall amount of (B) employed, (B) possessing, with particular preference, a five-membered cyclic carboxylic anhydride group and at least one further functional carboxyl, ester and/or anhydride group, and component (A), which preferably has primary amino and/or isocyanate groups. Organic solvents, preferably cresol, are used as the reaction medium.

One modification of this preparation process is to condense components (A) and (B) in the melt to form the polyimide.

To prepare the polyesterimide resins in accordance with stage (II) of the process according to the invention, from the polyimide obtained in accordance with stage (I) and component (C), use is made of the known transesterification catalysts, as have already been mentioned above in connection with the preparation of the polyester resins. Suitable examples are heavy metal salts, organic titanates, cerium compounds, and organic acids such as p-toluenesulfonic acid. Examples of heavy metal salts are lead acetate and zinc acetate. The titanates which can be employed include, for example, tetramethyl titanate, tetraethyl titanate, tetraisopropyl titanate, tetrapropyl titanate, tetrabutyl titanate, tetraamyl titanate, tetrahexyl titanate, diisopropyl dibutyl titanate or amyl[sic]titanates, such as tetraphenyl titanate, tetracresyl titanate, tetrahexyl titanate or else triethanolamine titanate. Process stage (II) as well can be conducted in the organic solvents as mentioned for stage (I) or in the melt.

In the final stage (III) of the process according to the invention the polyesterimide formed in accordance with stage (II) is reacted with the remaining part, preferably from 10 to 50% by weight, based on the overall amount of (B) employed, of component (B) The reaction takes place again in organic solvents or in the melt, preferably in the presence of the transesterification catalysts already mentioned.

The hydroxyl- and carboxyl-containing polyesterimide resulting after the novel process preferably has an acid number >80 mg of KOH/g, with particular preference an acid number of between 80 and 120 mg of KOH/g, and also preferably an OH number of between 100 and 150 mg of KOH/g.

The Wire Enamels Comprising the Hydroxyl- and Caboxyl-containing Polyesterimides According to the Invention The wire enamels according to the invention comprise the hydroxyl- and carboxyl-containing polyesterimide resins according to the invention preferably in amounts from 15 to 75% by weight, with particular preference from 30 to 55% by weight, based on the overall weight of the wire coating composition.

Organic solvents suitable for the wire enamels according to the invention are cresolic and other organic solvents. Examples are cresol, phenol, glycol ethers, dimethylglycol, ethylglycol, isopropylglycol, butylglycol, methyldiglycol, ethyldiglycol, butyl-diglycol, phenylglycol. Glycol ether esters also come into consideration, examples being methylglycol acetate, ethylglycol acetate, butylglycol acetate and methoxypropyl acetate.

Further examples are cyclic carbonates, for example polypropylene carbonate, cyclic esters, for example gamma-butyrolactone, and also dimethylformamide, N,N-dimethylacetamide and N-methylpyrolidone[sic]. It is also possible to employ aromatic solvents, benzyl alcohol, alone or in combination with the solvents mentioned.

The organic solvents can be replaced in part by extenders. It is preferred to use either pure solvent or mixtures of pure solvents, or solvents containing up to 40% by weight, based on their overall weight, of extenders. Examples of suitable extenders are xylene, Solventnaphtha®, toluene, ethylbenzene, cumene, heavy benzene, various Solvesso® and Shellsol® grades, and Deasol®.

The wire enamels according to the invention advantageously contain from 0.5 to 5.0% by weight, preferably from 0.5 to 4.0% by weight, of a phenolic resin, based on the overall weight of the wire enamel. Suitable phenolic resins are known condensation products of phenol, substituted phenols or bisphenol A with formaldehyde. The properties of the phenolic resins depend on the nature of the phenol component and of the aldehyde component, on the pH established in the course of preparation, and on the proportions of the two co-reactants. According to the present invention it is also possible to modify phenolic resins by the incorporation of other compounds in the course of polycondensation and by subsequent modification of the phenolic resin and by conducting the reaction process in different ways. In addition to the condensation products with formaldehyde, of course, those with other aldehydes can also be used.

As crosslinking catalysts in the curing of the wire enamels according to the invention it is possible to use the transesterification catalysts already mentioned above, judicially in a proportion of up to 5% by weight, preferably up to 3% by weight, based on the binder.

Wire enamels having particularly good properties are composed as follows:
(a) from 30 to 55% by weight of the hydroxyl and carboxyl-containing polyesterimide resin according to the invention,
(b) from 0.5 to 2.5% by weight, preferably from 0.5 to 1.5% by weight, of the catalyst
(c) from 38.5 to 69% by weight of the organic solvent, or of the solvent mixture
(d) from 0.5 to 5.0% by weight, preferably from 0.5 to 4.0% by weight, of the phenolic resin, based in each case on the overall weight of the wire enamel.

The wire coating compositions according to the invention may, furthermore, also include customary auxiliaries and additives. Preferred amounts are up to 1% by weight, based on the overall weight of the wire enamel components (a) to (d). As auxiliaries for the wire enamels it is possible, for example, to employ flow-improving melamine resins or leveling agents based on polyacrylates.

The wire enamels according to the invention are applied and cured by means of customary wire coating machines. In this context the particular enamel film thickness required is built up by at least 1 and up to 10 individual applications, each individual application of enamel being cured without bubbles before the next application of enamel. Customary coating machines operate with take-off speeds of from 5 to 180 m/min, depending on the thickness of the wire to be coated. Typical oven temperatures lie between 300 and 550° C. The coated wires are tested in accordance with IEC 851.

It is surprising, and was not foreseeable for the skilled worker, that the level of properties of the resulting enameled wire is outstanding despite the fact that the composition of the resin deviates greatly from that of a customary resin and that the coating rate is considerably higher than in the case of a standard enamel.

The examples set out below are intended to illustrate the invention.

EXAMPLES

Example 1

Preparing a Wire Enamel DL1 Comprising the Carboxyl-containing Polyesterimide PEI1 According to the Invention In accordance with stage (I) of the process according to the invention 166.7 g of Voranate® M590 (polyisocyanate with a mean isocyanate functionality of about 2.7: manufacturer Dow Chemical: component (A)) and 632 g of trimellitic anhydride (component (B)) are heated together with 291.3 g of cresol in a three-necked flask. During this heating operation, the carbon dioxide which forms during the reaction should form at a uniform rate. The reaction is over when the evolution of gas has finished.

In accordance with stage (II) of the process according to the invention 100.0 g of cresol 74.0 g of ethylene glycol (component (C)), 23.0 g of tris-2-hydroxyethyl isocyanurate (component (C)) and 2 g of tetra-n-butyl titanate are added to the batch. It is heated uniformly at 200° C. until a viscosity of 680 mPas at 80° C. is reached.

In accordance with stage (III) of the process according to the invention 66.7 g of cresol and 70.3 g of trimellitic anhydride (component (B)) are added to the cooled batch, and the mixture is heated again at 200° C. When the viscosity reaches the value of 850 mPas at 100° C., the batch is cooled. To the reaction mixture there are added 107.5 g of a 10% strength solution of tetra-n-butyl titanate in cresol, 216.7 g of cresol and 283.3 g of Solventnaphtha®.

The resulting wire enamel DL1 has a solids content of 35.1% and a viscosity of 1360 mPas. The polyesterimide resin PEI1 has an acid number of 100 mg of KOH/g and an OH number of 140 mg of KOH/g.

Example 2

Preparing A Wire Enamel DL2 Comprising the Carboxyl-containing Polyesterimide PEI2 According to the Invention In accordance with stage (I) of the process according to the invention 150.0 g of Voranate® M590 (polyisocyanate with a mean isocyanate functionality of about 2.7: manufacturer Dow Chemical: component (A)) and 208.8 g of trimellitic anhydride (component (B)) are heated [lacuna] 262.2 g of cresol in a three-necked flask. During this heating operation, the carbon dioxide which forms during the reaction should form at a uniform rate. The reaction is over when the evolution of gas has finished.

In accordance with stage (II) of the process according to the invention 90.0 g of cresol, 59.3 g of ethylene glycol (component (C)), 41.5 g of tris-2-hydroxyethyl isocyanurate (component (C)) and 1.8 g of tetra-n-butyl titanate are added to the batch. It is heated uniformly at 200° C. until a viscosity of 600 mPas at 80° C. is reached.

In accordance with stage (III) of the process according to the invention 45.0 g of cresol and 63.3 g of trimellitic anhydride (component (B)) are added to the cooled batch, and the mixture is heated again at 200° C. When the viscosity reaches the value of 620 mPas at 100° C., the batch is cooled. To the reaction mixture there are added 195.0 g of cresol, 255 g of Solventnaphtha® and 96.8 g of a 10% strength tetra-n-butyl titanate solution in cresol.

The resulting wire enamel DL2 has a solids content of 36.3% and a viscosity of 1520 mPas. The polyesterimide resin PEI2 has an acid number of 90 mg of KOH/g and an OH number of 126 mg of KOH/g.

Example 3

Preparing A Wire Enamel DL' Comprising a Polyesterimide PEI' Prepared by a Process Known from the Prior Art A polyester resin is prepared from 45.7 g of ethylene glycol (component (C)), 11.9 g of tris-2-hydroxyethyl iso-cyanurate (component (C)), 314.2 g of cresol, 102.2 g of dimethyl terephthalate (component (B)) and 0.4 g of tetra-n-butyl titanate by heating at 200° C. The batch is cooled to 90° C., and 69.5 g of diaminodiphenylmethane (component (A)) and 134.8 g of trimellitic anhydride (component (B)) are added. By heating at 200° C. a polyesterimide is prepared. The reaction mixture is diluted with 70.0 g of cresol and 70.0 g of Solventnaphta®.

The resulting wire enamel DL' has a viscosity of 800 mPas at a solids content of 40%. The polyesterimide resin PEI' has an acid number of 20 mg of KOH/g and an OH number of 170 mg of KOH/g.

The three wire enamels DL1, DL2 and DL' are coated as follows onto copper wire:

| | |
|---|---|
| Oven | MAG AW/1A |
| Temperature | 520° C. |
| Application system | Nozzles |
| Wire diameter | 0.71 mm |
| Number of passes | 10 |
| Degree of increase | 2 L |

The coated copper wires are tested in accordance wish IEC 851.

Coating results:

|  | DL1 | DL2 | DL' |
|---|---|---|---|
| Take-off speed (m/min) | 38 | 38 | 32 |
| Outer-fiber extension 1*d + x (%) | 20 | 25 | 25 |
| Thermal shock 1*d + 10% at ° C. | 250 | 260 | 200 |
| Breakdown voltage (kV) | 9.0 | 9.0 | 9.2 |
| Softening temperature (° C.) | 400 | 400 | 400 |

As can be seen from the coating results, the wire enamels according to the invention permit a considerably higher coating rate (take-off speed) and exhibit an outstanding level of properties.

What is claimed is:

1. A process for preparing hydroxyl- and carboxyl-containing polyesterimide resins comprising as monomeric components
    (A) one or more imide-forming compounds comprising
        (i) at least one group selected from the group consisting of primary amino groups, isocyanate groups, and mixtures thereof, and
        (ii) at least one further functional group selected from the group consisting of primary amino groups, isocyanate groups, hydroxyl groups, carboxyl groups, carboxylic anhydride groups, and mixtures thereof;
    (B) one or more members selected from the group consisting of polycarboxylic acids, anhydrides of polycarboxylic acids, esters of polycarboxylic acids, and mixtures thereof; and
    (C) polyols;
    the process comprising:
        (I) reacting component (A) with part of component (B) to form a polyimide,
        (II) reacting the polyimide with component (C) to form a polyesterimide, and
        (III) reacting the polyesterimide with the remaining part of component (B) to form a hydroxyl- and carboxyl-containing polyesterimide.

2. The process of claim 1, characterized in that the hydroxyl- and carboxyl-containing polyesterimide has an acid number of at least 80 mg of KOH/g.

3. The process of claim 1, wherein component (A) comprises a compound selected from the group consisting of polyisocyanates, polyamines having at least two primary amino groups, amino alcohols having at least one primary amino group, amino acids having at least one primary amino group, and mixtures thereof.

4. The process of claim 1, wherein component (B) comprises a polycarboxylic anhydride having at least one cyclic five-membered carboxylic anhydride structure and at least one further group selected from the group consisting of a carboxylic acid group, a carboxylic anhydride group, and mixtures thereof.

5. The process of claim 1, wherein component (C) comprises a member selected from the group consisting of a diol, a triol, and mixtures thereof.

6. The process of claim 1, characterized in that component (C) comprises tris-2-hydroxyethyl isocyanurate.

7. A coating composition comprising a hydroxyl- and carboxyl-containing polyesterimide prepared by the process of claim 1.

8. A wire enamel composition comprising a binder comprising, relative to the total weight of the enamel composition, from 15 to 75% by weight of at least one hydroxyl- and carboxyl-containing polyesterimide having an acid number of at least 80 mg of KOH/g.

9. The wire enamel composition of claim 8, wherein the hydroxyl- and carboxyl-containing polyesterimide comprises as monomeric components:
    (A) one or more imide-forming compounds comprising at least one group selected from the group consisting of primary amino groups, isocyanate groups or mixtures thereof, and at least one further functional group selected from the group consisting of primary amino groups, isocyanate groups, hydroxyl groups, carboxyl groups, carboxylic anhydride groups, and mixtures thereof,
    (B) one or more members selected from the group consisting of polycarboxylic acids, anhydrides of polycarboxylic acids, esters of polycarboxylic acids, and mixtures thereof, and
    (C) polyols.

10. The wire enamel composition of claim 9, wherein component (A) comprises a a compound selected from the group consisting of polyisocyanates, polyamines having at least two primary amino groups, amino alcohols having at least one primary amino group, amino acids having at least one primary amino group, and mixtures thereof.

11. The wire enamel composition of claim 9, wherein component (B) comprises a compound selected from the group consisting of polycarboxylic anhydrides having at least one cyclic five-membered carboxylic anhydride structure and at least one further group selected from the group consisting of a carboxylic acid group, carboxylic anhydride group, and mixtures thereof.

12. The wire enamel composition of claim 9, wherein component (C) comprises a member selected from the group consisting of a diol, a triol, and mixtures thereof.

13. The wire enamel composition of claim 9, characterized in that component (C) comprises tris-2-hydroxyethyl isocyanurate.

14. The wire enamel composition of claim 8, characterized in that the hydroxyl- and carboxyl-containing polyesterimide has been prepared by the process of 1.

15. The wire enamel composition of claim 8, comprising:
    (a) from 30 to 55% by weight of the hydroxyl- and carboxyl-containing polyesterimide,
    (b) from 0.5 to 2.5% by weight of a catalyst,
    (c) from 38.5 to 69% by weight of an organic solvent and
    (d) from 0.5 to 5% by weight of a phenolic resin,
the sum of components (a) to (d) making up 100% by weight of the wire enamel composition.

16. The process of claim 3 wherein component (A) comprises an imide forming compound comprising at least two primary amino groups.

17. The process of claim 3 wherein component (A) comprises an imide forming compound comprising at least two isocyanate groups.

18. The process of claim 1 wherein component (A) comprises an imide forming compound comprising at least one group selected from the group consisting of primary amino groups, isocyanate groups, and mixtures thereof, and at least one further functional group selected from the group consisting of hydroxyl groups, carboxyl groups, carboxylic anhydride groups and mixtures thereof.

* * * * *